C. H. SWEET.
NUT LOCK.
APPLICATION FILED NOV. 29, 1918.

1,314,164.

Patented Aug. 26, 1919.

C. H. Sweet
Inventor

By Norman J. Whitaker
his Attorney

UNITED STATES PATENT OFFICE.

CHARLES H. SWEET, OF ELKHART, INDIANA.

NUT-LOCK.

1,314,164.  Specification of Letters Patent.  Patented Aug. 26, 1919.

Application filed November 29, 1918. Serial No. 264,648.

*To all whom it may concern:*

Be it known that I, CHARLES H. SWEET, a citizen of the United States, and a resident of Elkhart, in the county of Elkhart and State of Indiana, have invented new and useful Improvements in Nut-Locks, of which the following is a specification.

This invention relates to nut locks and has for its primary object to provide a means whereby a nut may be securely locked in a desired position with respect to the bolt carrying the same.

A further object of the invention is to provide a lock of the class described which may be easily secured in a locking position upon a bolt and nut.

A further object of the invention is to provide a device of the character described which is simple in construction, inexpensive to manufacture and reliable in operation.

Other objects and advantages of the invention will be apparent during the course of the following description taken in connection with the accompanying drawings.

Figure 1:
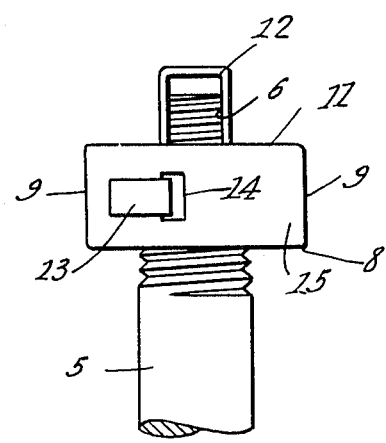
Figure 2:
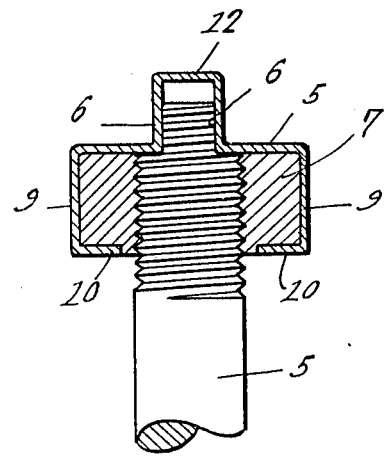
Figures 3, 4:
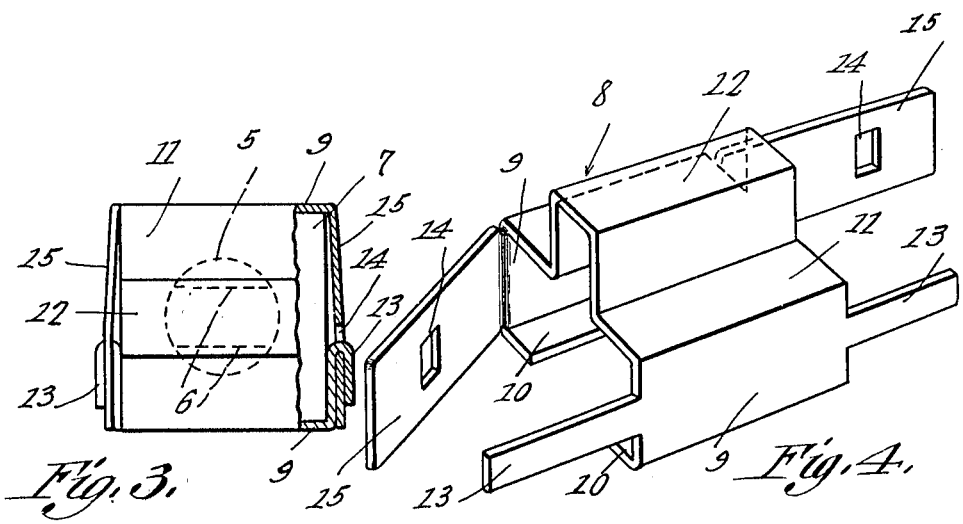

In the drawings, forming a part of this specification and in which like numerals are employed to designate like parts throughout the same, Figure 1 is a side elevation of the device embodying my invention, Fig. 2 is a vertical central sectional view of the same, Fig. 3 is a top plan view of Fig. 1, a portion of the device being broken away, and, Fig. 4 is a perspective view of the device.

In the drawings, wherein for the purpose of illustration is shown a preferred form of my invention, the numeral 5 indicates a bolt having threads, the thread end of the bolt 5 being cut away or flattened to provide faces 6. The nut 7 employed in connection with the bolt 5 may be of any desired shape but I have for the purpose of illustration shown a nut having four faces.

As a means for locking the nut 7 with respect to the bolt 5 there is provided a cap indicated as a whole by the numeral 8. This cap comprises a pair of side members 9 having secured at the lower edges thereof a pair of flanges 10 while at the upper edges thereof there is arranged a cover 11 which is stamped or bent to provide a cap 12 sufficiently large to receive the flattened end 6 of the bolt 5. To one of the side members 9 there is secured a pair of tongues 13 adapted for insertion within openings 14 arranged relatively near the ends of wings 15 which are secured to the side member 9 opposite the side member to which the tongues 13 are secured.

When it is desired to lock the nut 7 upon the bolt 5 the cap 8 is placed in the position clearly shown in Figs. 1 and 2 whereupon the wings 15 are bent substantially parallel to opposite sides of the nut 7 as clearly shown in Fig. 3. When the wings 15 are bent to the position shown in Fig. 3 the tongues 13 are inserted into the openings 14 and bent upon the wings as clearly shown in Fig. 3. By this arrangement of elements the cap 8 is locked with respect to the bolt 5 and the nut 7 being locked or secured to the cap 8 is therefore locked against rotation with respect to the bolt 5.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A nut lock comprising a cap having a pair of side members, a pair of tongues secured to one of said side members, and a pair of wings secured to the other of said side members, said wings being provided with apertures adapted to receive the ends of said tongues.

2. A nut lock comprising a cap having a pair of side members, a pair of tongues secured to one of said side members, a pair of wings secured to the other of said side members, said wings being provided with apertures adapted to receive the ends of said tongues, and a cover connecting said side members, said cover being bent to provide a recess adapted to receive the end of a bolt whereby said cap may be locked against rotation with respect to said bolt.

3. A nut lock comprising side members having flanges adapted to engage a face of a nut, a cover connecting said side members and bent to provide a cap adapted to receive the end of a bolt whereby said side members are retained against rotation with respect to said bolt, a pair of tongues connected to one of said side members, and a pair of wings connected to the other of said side members, said wings being provided with apertures adapted to receive said tongues.

CHARLES H. SWEET.

Copies of this patent may be obtained for five cents each, by addressing the "Commissioner of Patents, Washington, D. C."